(12) United States Patent
Althouse

(10) Patent No.: US 10,877,972 B1
(45) Date of Patent: Dec. 29, 2020

(54) SYSTEMS AND METHODS FOR HIGH EFFICIENCY DATA LOGGING

(71) Applicant: JA1, Inc., Round Hill, VA (US)

(72) Inventor: John Brooke Althouse, Round Hill, VA (US)

(73) Assignee: JA1, INC., Round Hill, VA (US)

( * ) Notice: Subject to any disclaimer, the term of this patent is extended or adjusted under 35 U.S.C. 154(b) by 0 days.

(21) Appl. No.: 16/940,062

(22) Filed: Jul. 27, 2020

(51) Int. Cl.
*G06F 16/2455* (2019.01)
*G06F 16/215* (2019.01)
*G06F 16/28* (2019.01)

(52) U.S. Cl.
CPC ...... *G06F 16/24556* (2019.01); *G06F 16/215* (2019.01); *G06F 16/285* (2019.01)

(58) Field of Classification Search
CPC .. G06F 16/27; G06F 16/2358; G06F 11/3476; G06F 16/273; G06F 16/2477
USPC ........................................ 707/634, 648, 755
See application file for complete search history.

(56) References Cited

U.S. PATENT DOCUMENTS

| 10,402,420 | B2* | 9/2019 | Brown | G06F 16/2291 |
| 2014/0279907 | A1* | 9/2014 | Koza | G06F 16/128 |
| | | | | 707/639 |
| 2017/0004185 | A1* | 1/2017 | Zhu | G06F 11/0766 |
| 2019/0065587 | A1* | 2/2019 | Lin | G06F 16/958 |
| 2019/0318100 | A1* | 10/2019 | Bhatia | G06F 21/577 |
| 2020/0042424 | A1* | 2/2020 | Zhang | G06F 11/3452 |
| 2020/0117389 | A1* | 4/2020 | Kang | G06F 3/0644 |

* cited by examiner

*Primary Examiner* — Dangelino N Gortayo
(74) *Attorney, Agent, or Firm* — Bayes PLLC

(57) ABSTRACT

Systems and methods for managing log data are provided. An exemplary system may include a memory storing computer-readable instructions that, when executed by at least one processor, may cause the at least one processor to perform operations. The operations may include accessing a plurality of log records. Each of the plurality of log records may include a time stamp and at least one attribute. The operations may also include identifying a subset of the plurality of log records based on the at least one attribute of each of the plurality of log records. The operations may also include grouping the log records within the subset into at least one group based on the time stamp of each of the log records within the subset. The operations may further include aggregating the log records in the at least one group based on the respective time stamps.

18 Claims, 9 Drawing Sheets

SYSTEMS AND METHODS FOR HIGH EFFICIENCY DATA LOGGING

TECHNICAL FIELD

The present disclosure relates to computer log data management, and more particularly, to systems and methods for deduplicating computer log data to enable high-efficiency storage and high-speed queries.

BACKGROUND

The proliferation of "Big Data" analyses and related applications have made data gathering of significant importance. For example, logging has become ubiquitous for nearly all kinds of computer-related activities, spawning a large amount of computer log data. Organizations around the world extensively accumulate computer log data, hoping to derive value from them. Such an obsession to Big Data requires a large volume of storage space to store the computer log data. In addition, querying through the vast amount of computer log data is time consuming, diminishing the value and usefulness of such data.

Embodiments of the present disclosure provide systems and methods for reducing the volume of the computer log data while preserving the information contained therein, thereby enabling high-efficiency storage and high-speed queries.

SUMMARY

In one example, a system for managing computer log data may include a memory storing computer-readable instructions and at least one processor communicatively coupled to the memory. The computer-readable instructions, when executed by the at least one processor, may cause the at least one processor to perform operations. The operations may include accessing a plurality of log records. Each of the plurality of log records may include a time stamp and at least one attribute. The operations may also include identifying a subset of the plurality of log records based on the at least one attribute of each of the plurality of log records. Log records within the subset may share a common attribute. The operations may also include grouping the log records within the subset into at least one group based on the time stamp of each of the log records within the subset. Time stamps of the respective log records in the at least one group may be within a time span. The operations may further include aggregating the log records in the at least one group based on the respective time stamps.

In another example, a method for managing computer log data is provided. The method may include accessing a plurality of log records. Each of the plurality of log records may include a time stamp and at least one attribute. The method may also include identifying a subset of the plurality of log records based on the at least one attribute of each of the plurality of log records. Log records within the subset may share a common attribute. The method may also include grouping the log records within the subset into at least one group based on the time stamp of each of the log records within the subset. Time stamps of the respective log records in the at least one group may be within a time span. The method may further include aggregating the log records in the at least one group based on the respective time stamps.

In a further example, a non-transitory computer-readable medium may store instructions that, when executed by at least one processor, cause the at least one processor to perform a method for managing computer log data. The method may include accessing a plurality of log records. Each of the plurality of log records may include a time stamp and at least one attribute. The method may also include identifying a subset of the plurality of log records based on the at least one attribute of each of the plurality of log records. Log records within the subset may share a common attribute. The method may also include grouping the log records within the subset into at least one group based on the time stamp of each of the log records within the subset. Time stamps of the respective log records in the at least one group may be within a time span. The method may further include aggregating the log records in the at least one group based on the respective time stamps.

DETAILED DESCRIPTION

The advance in Big Data analyses prompts many organizations to harvest data by logging a wide range of user activities, such as network connection activities, system logging-in/out activities, etc. Such extensive logging operations require a large volume of storage space, imposing a heavy tax on hardware resources. Moreover, the vast amount of data makes information querying slow and inefficient, greatly diminishing the value and usefulness of the data. It is challenging to reduce the volume of the logged data while keeping a high degree of fidelity of the data.

Embodiments of the present disclosure provide systems and methods for managing computer log data by deduplicating redundant information from the original data. Exemplary systems and methods can improve the efficiency of computer log data storage, as well as the speed of information querying. For example, embodiments of the disclosure may identify data fields that are duplicative across multiple log records and combine the multiple log records into an aggregated log record. The aggregated log record may contain a single copy of the duplicative contents and an aggregated version of non-duplicative contents extracted from the multiple log records. In this way, the amount of computer log data requiring storage can be significantly reduced.

In this disclosure, various embodiments are disclosed in the context of managing computer log data, including computer data resulting from logging computer-related activities such as network connection activities, system logging-in/out activities, software program operation activities, computer diagnostic activities, etc. It is noted that methods and systems disclosed herein can also be used to manage general log data, such as sensor data, monitoring data, health data, sports data, etc., so long as such log data are logged according to certain temporal coding mechanisms such as time stamps.

Log data may be organized as a set of log records. As used herein, a "log record" may also be referred to as a "log entry" or simply a "record," referring to a unit of information logged at a time point or corresponding to a time stamp. A log record may include a plurality of data fields, including, for example, a time stamp, an ID indicating the user whose activities are logged, an event/action/result relating to the circumstances of the log record, etc.

Figure 1:
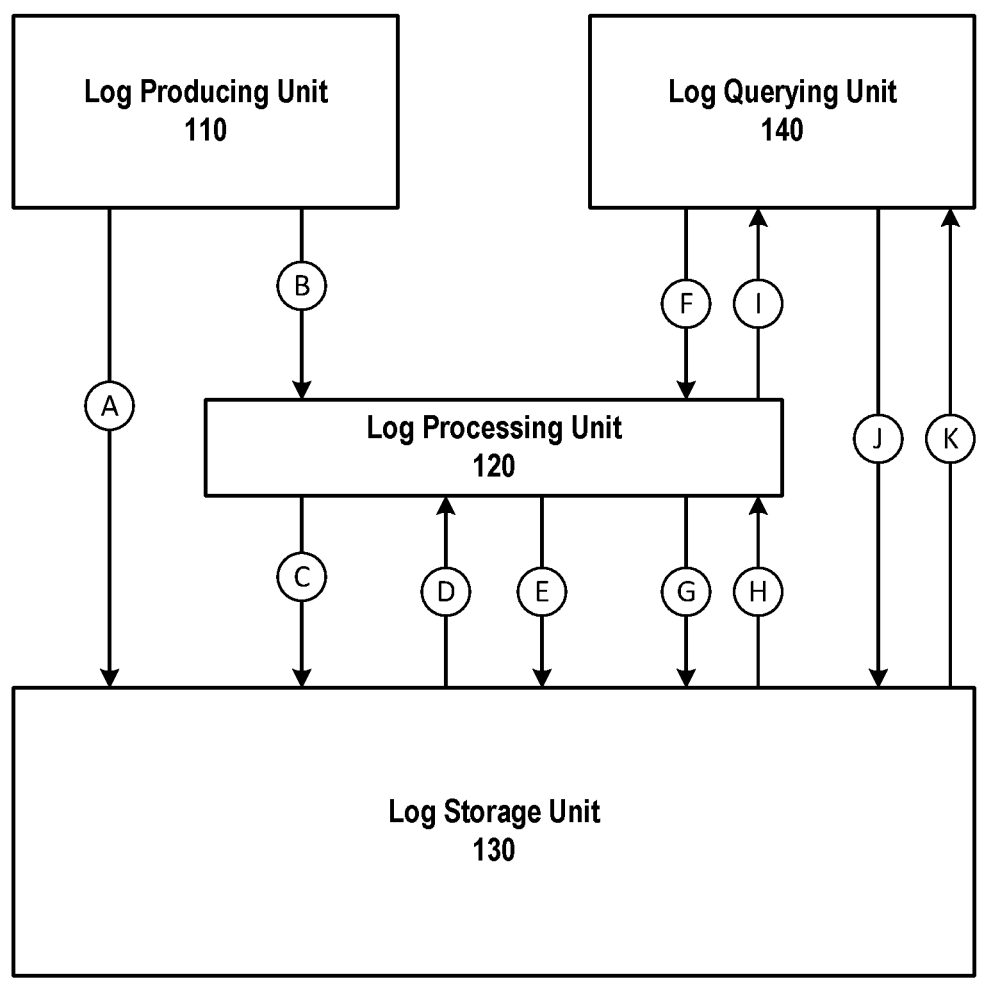
FIG. 1 an exemplary system for managing computer log data, according to embodiments of the disclosure.

FIG. 1 illustrate an exemplary system 100 for managing log data, according to embodiments of the disclosure. As shown in FIG. 1, system 100 may include a log producing unit 110, a log processing unit 120, a log storage unit 130, and a log querying unit 140. Log producing unit 110 may include any suitable computer or device configured to produce log data. Exemplary log producing unit 110 may include a computer programmed to be log use logging-in/out activities, a networked computer programmed to log network connection activities, a mobile device equipped with a geolocation sensor and programmed to log location information, a payment device configured to log financial transactions, an activity tracker configured to log steps, heart rates, blood pressures, etc., or any other device capable of recording information on a periodic or event-triggered basis.

Log storage unit 130 may include any suitable computer, server, database, and service platform (e.g., Splunk developed b Splunk Inc., Elastic Stack (also known as ELK Stack) developed by Elasticsearch B.V., etc.) that are configured/programmed to store log data. In some embodiments, log storage unit 130 may be implemented as a separate component from log producing unit 110. For example, log storage unit 130 may be implemented on a separate computer from that of log producing unit 110. In some embodiments, log storage unit 130 may be integrated with log producing unit 110. For example, the functions of log producing unit 110 and log storage unit 130 may be implemented by software packages installed on a same computer.

Log processing unit 120 may include a computer system programmed to process the log data produced by log producing unit 110 and/or stored in log storage unit 120. FIG. 1 illustrates several examples of log data flows among log producing unit 110, log processing unit 120, and log storage unit 130. As shown in FIG. 1, log data produced by log producing unit 110 (also referred to as original log data) may be sent directly to log storage unit 130 for storage along path A. After log storage unit 130 receives the original log data from log producing unit 110, log storage unit 130 may store the original log data without calling log processing unit 120. After that, log processing unit 120 may access the original log data stored in log storage unit 130 by, for example, retrieving the original log data from log storage unit 130 along path D, process the original log data to reduce the size of the original log data using methods disclosed herein, and send the processed log data back to log storage unit 130 along path E to replace the original log data stored in log storage unit 130. In this way, log processing unit 120 may reduce the size of existing log data stored in any log storage system. In the following, log processing in this manner (e.g., log data flow along paths D and E) is also referred to as historical log data processing.

In some embodiments, log processing unit 120 may be configured to process original log data produced by log producing unit 110 before the original log data reach log storage unit 130. For example, log processing unit 120 may be located between log producing unit 110 and log storage unit 130. In other words, log processing unit 120 may be located upstream to log storage unit 130 to process the incoming original log data produced by log producing unit 110 before the original log data reach log storage unit 130. As shown in FIG. 1, the original log data may be sent from log producing unit 110 to log processing unit 120 along path B. After log processing unit 120 processes the original log data (e.g., to reduce the data size), the processed log data may be sent from log processing unit 120 to log storage unit 130 along path C. In the following, log processing in this manner (e.g., log data flow along paths B and C) is also referred to as inline log data processing.

Log querying unit 140 may include any suitable computer, terminal, mobile device, etc. that is programmed to query log data stored in log storage unit 130. In some embodiments, log query unit 140 may query log storage unit 130 directly along path J. When log storage unit 130 stores processed log data processed by log processing unit 120, the volume or size of the processed log data can be significantly smaller than that of original log data, allowing the query to traverse through the processed log data much faster, thereby improving data querying speed. The result of the query (e.g., one or more processed log records that satisfy query condition(s)) may be returned from log storage unit 130 to log querying unit 140 along path K. In some embodiments, log querying unit 140 may query log data through log processing unit 120. For example, a request for retrieving log records that satisfy certain query conditions may be sent from log querying unit 140 to log processing unit 120 along path F. Log processing unit 120 may in turn send the request to log storage unit 130 along path G to locate the log records. In this case, log storage unit 130 may or may not store log data in the processed form. For example, log storage unit 130 may store original log data, or store a combination of original and processed log data. In any case, the log data satisfying the query conditions may be retrieved from log storage unit 130 and sent to log processing unit 120 along path H. Log processing unit 120 may process the received log data when needed, and send the processed log data to log querying unit 140 along path I.

In some embodiments, log processing unit 120 may be implemented as a stand-alone device that includes its dedicated computational resources, which may interface with other components of system 100 (e.g., 110, 130, 140) through communication channel(s) (e.g., network connections, direct cable connections, etc.). For example, log processing unit 120 may be implemented on a server and functions of log processing unit 120 may be implemented as Software as a Service (SaaS). In some embodiments, log processing unit 120 may be implemented as an add-on device that can be integrated with or added on to one or more other components of system 100 (e.g., 110, 130, 140). For example, log processing unit 120 may be implemented on a smart card, a system on a chip (SoC), or other forms of add-on or plugged-in devices that can be integrated with log producing unit 110, log storage unit 130, and/or log querying unit 140. In some embodiments, log processing unit 120 may use hardware resources of one or more other components of system 100 (e.g., 110, 130, 140). For example, log processing unit 120 may be implemented as a software program that can be installed on log producing unit 110 and/or log storage unit 130 to perform historical and/or inline log data processing. In some embodiments, log processing unit 120 may be implemented as a combination of the above discussed forms. For example, log processing unit 120 may be implemented as a SaaS with a plug-in program acting as a communication portal installed on log producing unit 110, log storage unit 130, and/or log querying unit 140.

Figure 2:
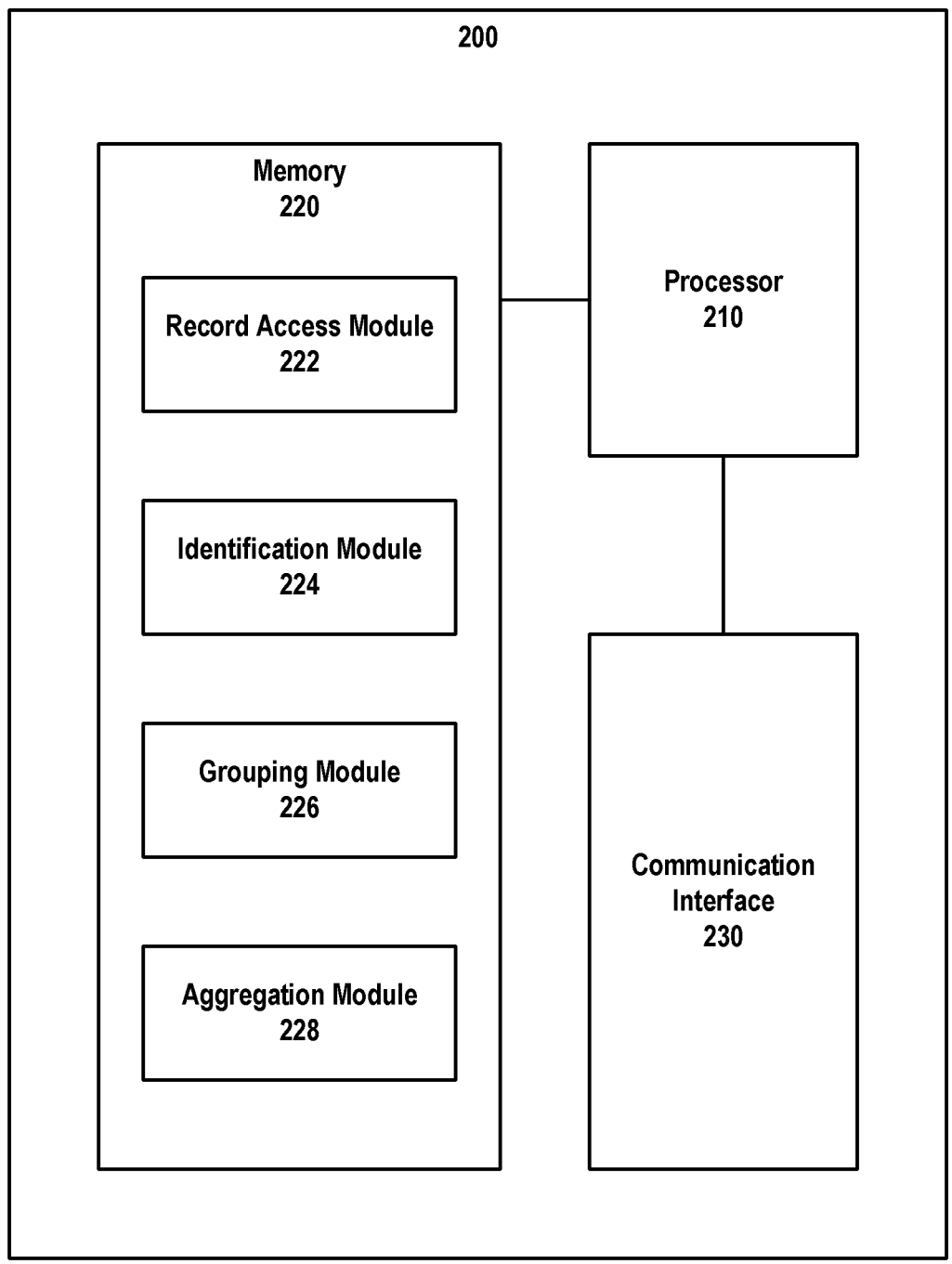
FIG. 2 illustrates an exemplary implementation of a computer system configured to manage computer log data, according to embodiments of the disclosure.

FIG. 2 illustrates an exemplary implementation of a computer system 200 configured to manage computer log data, according to embodiments of the disclosure. Computer system 200 may be configured or programmed to implement any component of system 100, such as log producing unit 110, log processing unit 120, log storage unit 130, and log querying unit 140. As shown in FIG. 2, computer system 200 may include a processor 210, a memory 220, and a communication interface 230.

Processor 210 may include any suitable data processing devices such as a microprocessor, a central processing unit (CPU), a graphics processing unit (GPU), or the like. Processor 210 may be implemented in a centralized or distributed manner, depending on particular applications. Processor 210 may execute computer-readable instructions, such as software codes, to perform various operations disclosed herein. Processor 210 may be communicatively coupled to memory 220 and communication interface 230 via data transmission channels such as data buses.

Communication interface 230 may include any suitable software, middleware, firmware, and/or hardware that are configured to establish communication links between computer system 200 and an external device and/or to facilitate input/output of information. For example, communication interface 230 may include wired connection devices such as an Ethernet adapter, a modem, a coaxial cable adaptor, a fiber optical adapter, or the like. In another example, communication interface 230 may include wireless connection devices such as a wireless network adapter, a telecommunication modem, a satellite communication modem, a short-range communication adapter, or the like. In yet another example, communication interface 230 may include I/O devices such as a display, a keyboard, a mouse, a printer, a touch screen, a speaker, or the like.

Memory 220 may include any suitable memory devices and/or storage media, such as a read only memory (ROM), a flash memory, a random access memory (RAM), a static memory, a hard drive, a semiconductor-based memory, etc., on which computer-readable instructions are stored in any suitable format. In some embodiments, memory 220 may store computer-readable instructions of one or more log data management programs or software modules, which can be executed by processor 210 to perform various operations and functions. As shown in FIG. 2, memory 220 may store computer-readable instructions of a record access module 222, an identification module 224, a grouping module 226, and an aggregation module 228. In some embodiments, two or more of the modules shown in FIG. 2 may be combined. In some embodiments, additional modules for managing log data may be stored in memory 220. In some embodiments, one or more of the modules shown in FIG. 2 may be omitted. Modules 222-228 will be described in greater detail in the following passages.

Figure 3:
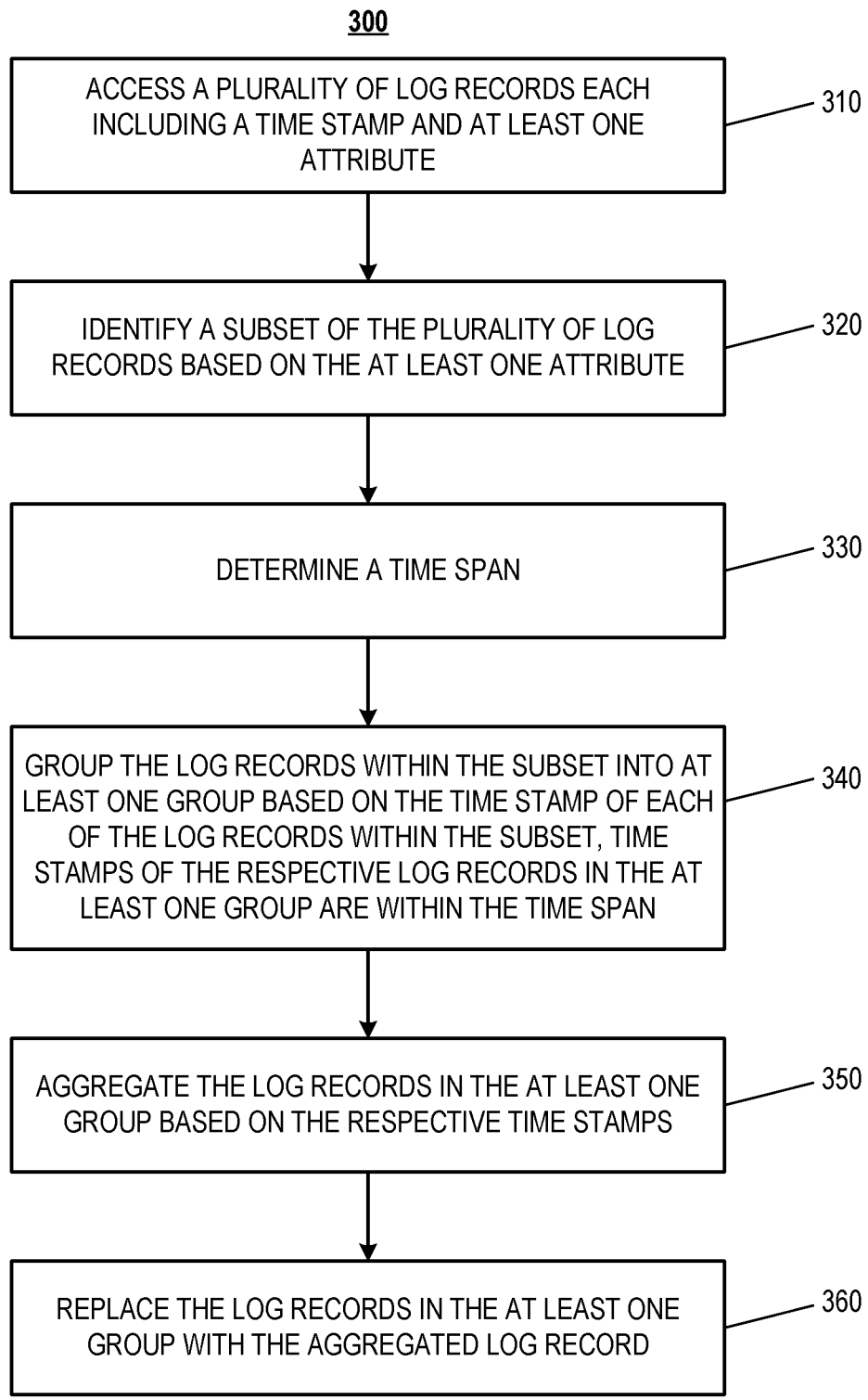
FIG. 3 is a flowchart of an exemplary method for managing computer log data, according to embodiments of the disclosure.
Figure 4:
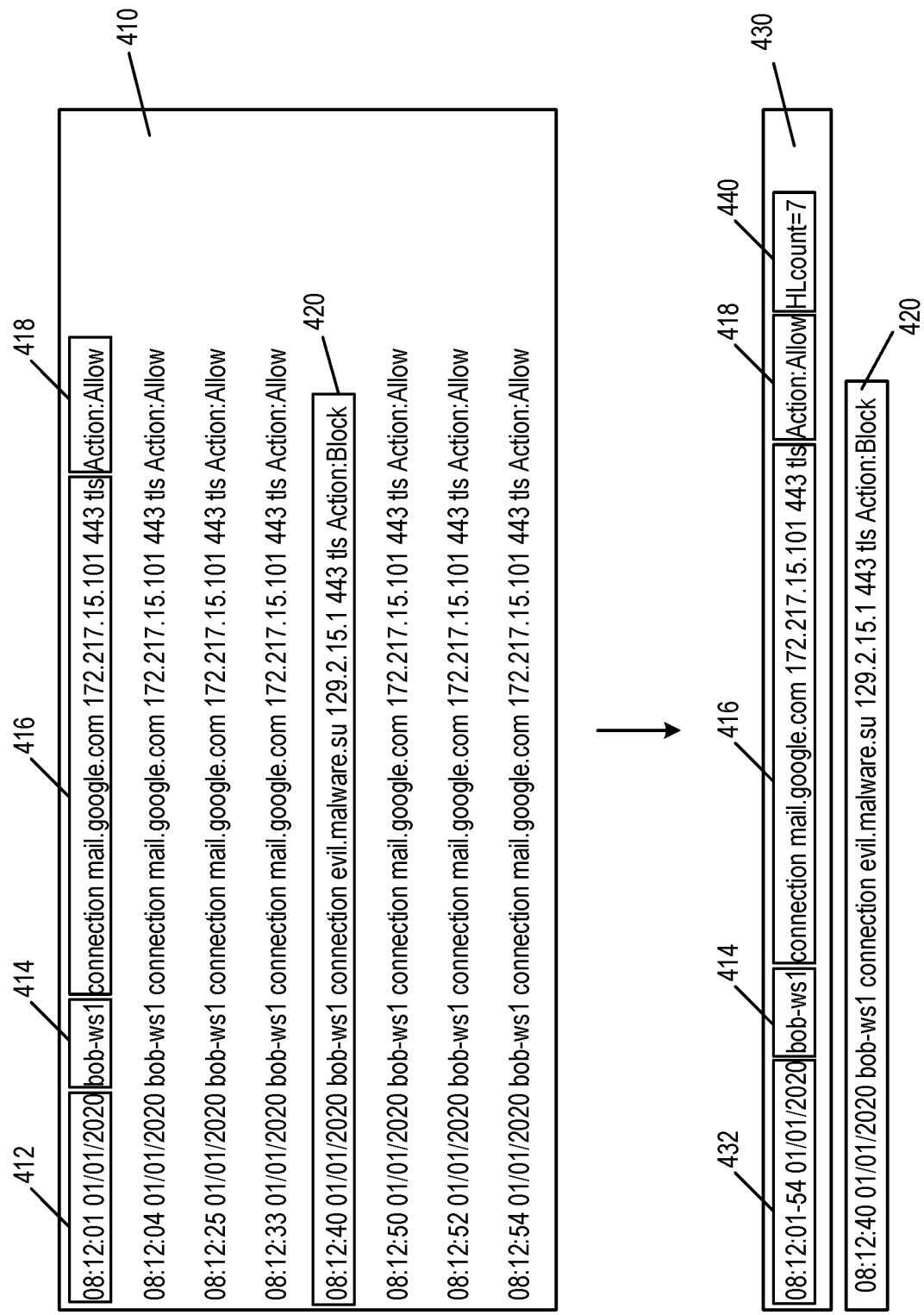
FIGS. 4-6 illustrate computer log record processing examples, according to embodiments of the disclosure.
Figure 5:
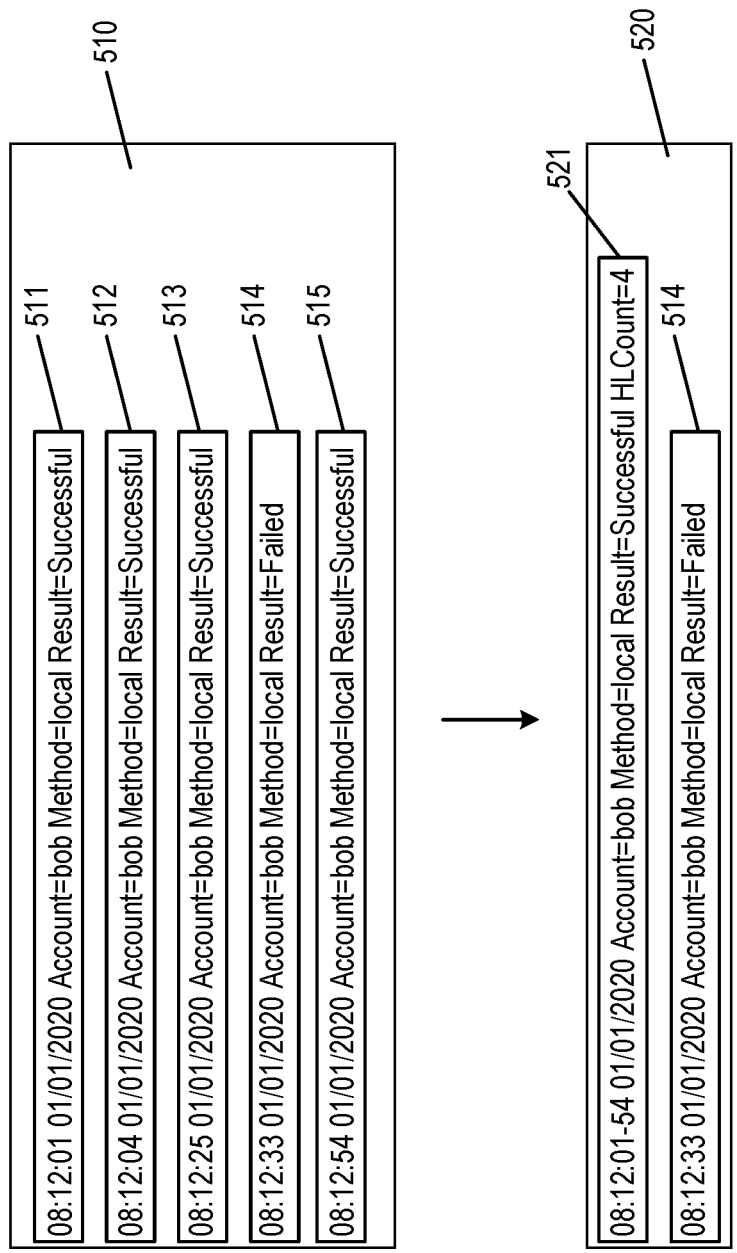
Figure 6:
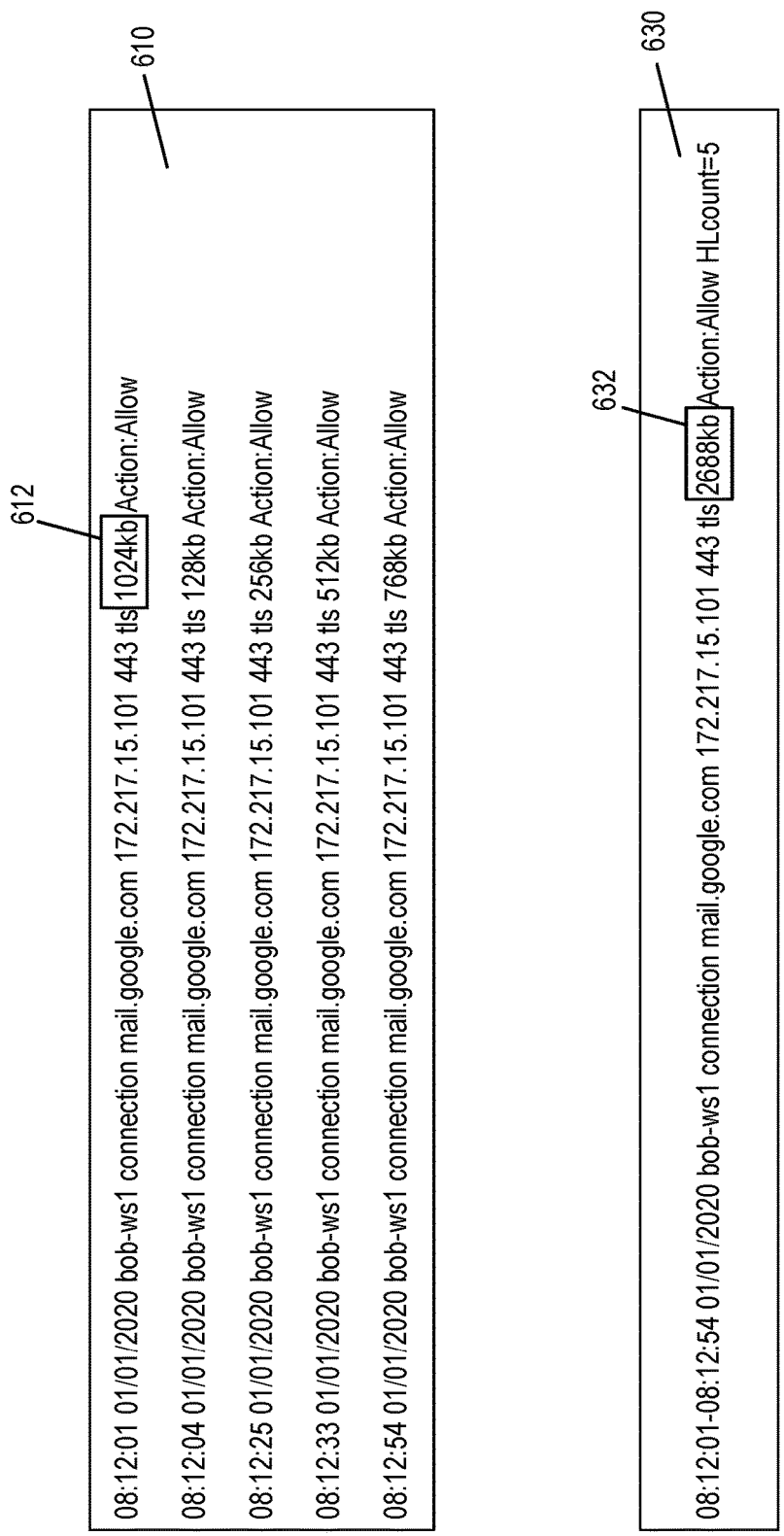

FIG. 3 is a flowchart of an exemplary method 300 for managing computer log data, according to embodiments of the disclosure. Method 300 may be performed by components of system 100, for example, log processing unit 120, which can be implemented by computer system 200. For example, method 300 may be performed by processor 210 by executing software modules stored in memory 220. Method 300 may include several steps, some of which may be omitted. In addition, the steps may be performed in a different order than the one shown in FIG. 3. One or more steps may also be performed simultaneously. FIGS. 4-6 show log processing examples that can be performed by log processing unit 120. In the following, FIGS. 2-6 will be described together.

Referring to FIG. 3, method 300 may start from step 310, in which processor 210 may access a plurality of log records. For example, processor 210 may execute instructions of record access module 222 to perform step 310. In some embodiments, processor 210 may access log records stored in log storage unit 130 (e.g., by obtaining the log records along path D shown in FIG. 1). In some embodiments, processor 210 may access log records generated by log producing unit 110 (e.g., by receiving the log records along path B shown in FIG. 1). FIG. 4 shows exemplary log records 410 that can be accessed by processor 210. As described above, log records 410 may also be referred to as original log records 410 that are stored in log storage unit 130 or produced by log producing unit 110, and then subsequently accessed by log processing unit 120.

As shown in FIG. 4, log records 410 may include multiple lines, each representing a log record logged at a specific time point. Each log record may include several data fields, including, for example, a time stamp 412, an ID 414, a network connection data field 416, and an action data field 418. Time stamp 412 may include data information and time information, as shown in FIG. 4. It is noted that other forms of time stamp may also be used, including time stamps that have different degrees of precision to record time. ID 414 may include any types of identification information that indicate a user whose activities are logged, such as a username, a network ID, a computer ID, or the like. Network connection data field 416 may include any suitable information regarding network connection activities, such as activity type (e.g., "connection" shown in FIG. 4) and source information (e.g., domain name, IP address, port number, protocol, etc.). As used herein, source information refers to any information relating to a network resource, regardless of whether the network resource acts as a source or a destination in any particular network data transmission. For example, network connection data field 416 shown in FIG. 4 includes source information that includes a domain name ("mail.google.com"), an IP address ("172.217.15.101"), a port number ("443"), and a connection protocol ("tls"). Action data field 418 may include information indicating any action taken with respect to the corresponding network connection activity. For example, action data field 418 shown in FIG. 4 shows that the connection with Google mail server was allowed. As used herein, data fields other than time stamp 412, such as ID 414, network connection data field 416, and action data field 418, may also be generally referred to as attributes of a log record.

Log records 410 illustrate a typical set of original log records that are ordinarily produced by log producing unit 110 and/or stored in log storage unit 130. Storing log records in such a form has many drawbacks. For example, many log records are duplicative, containing identical information other than the time stamps. Such type of log records are very common in applications such as network activity logging and system logging-in/out logging, where user activities are highly repetitive, leading to a high degree of duplication in the corresponding log data. As a result, a vast amount of storage resources is wasted to store the duplicative information, and the size of the database for storing the log data is huge. This also leads to low efficiency in information querying because useful information is buried in duplicative data lake and the query command must traverse countless duplicative log records to search for the useful information.

For example, as shown in FIG. 4, log records 410 may contain a log record 420, which logs a potential security thread that may have much higher value than the other log records that merely log ordinary routine network connections to Google's mail server. However, because the number of log records logging routine activities is much higher than the number of log records logging non-routine activities, it is difficult to quickly identify such small number of outliers.

Embodiments of the disclosure, such as method 300 performed by log processing unit 120, can improve the efficiency of log data storage and the speed of information querying. Turning back to FIG. 3, method 300 may proceed from step 310 to step 320, in which processor 210 may identify a subset of the plurality of log records based on the at least one attribute of each of the plurality of log records. For example, processor 210 may execute instructions of identification module 224 to perform step 320. In some embodiments, the subset may be identified based on a common attribute, such that log records within the subset share a common attribute. For example, referring to FIG. 4, all of the log records 410 except log record 420 share common attributes 414, 416, and 418. Based on the common attributes, processor 210 may identify a subset of log records, for example, a subset consisting of all of the log records 410 except log record 420. In some embodiments, processor 210 may identify the subset based on source information. Again, take log records 410 for example, processor 210 may identified those log records having the same source information contained in network connection data field 416 (e.g., domain name and/or IP address). In this case, the identified subset also consists of all of the log records 410 except log record 420.

In some embodiments, processor 210 may identify the subset of log records based on other types of attributes. For instance, FIG. 5 shows another set of exemplary log records 510 recording logging-in information. Each log record in 510 includes a time stamp and three attributes: an account ID, a login method, and a login result. Processor 210 may identify a subset of log records 510 based on the login results. For example, the subset may include all of the log records that include a successful login result. As a result, processor 210 may identify the subset consisting of log records 511, 512, 513, and 515.

In some embodiments, processor 210 may identify a subset of log records that share any one or more common attributes. The one or more common attributes may be predetermined, received from a user based on user input or selection, or dynamically determined. For example, processor 210 may be programmed to scan the source information of network connection type of log records to select those log records having the same source information to be included into the subset. In another example, the common attribute(s) may be provided by a user, and processor 210 may be programmed to search for log records sharing the common attribute(s) and include those log records into the subset. In yet another example, processor may dynamically determine the basis for including log records into the subset. The basis (e.g., number and/or type of attributes) may be dependent on the type of log records, the number of log records to be processed, or other suitable criteria.

Returning to FIG. 3, method 300 may proceed to step 330, in which processor 210 may determine a time span. For example, processor 210 may execute instructions of grouping module 226 to perform step 330. The time span may be used to group log records sharing a common attribute for aggregation. For example, a time span of one minute may be used to group together those log records sharing a common attribute and also within a one-minute time span such that the log records within the group can be aggregated into a single log record, thereby reducing the storage space required to store these log records. Similarly, time spans of other lengths of time period, such as five minutes, 10 minutes, 30 minutes, one hour, two hours, five hours, 12 hours, one day, one week, two weeks, one month, three months, six months, one year, etc., can also be used.

In some embodiments, the time span may be predetermined. For example, in the inline log data processing mode, a rolling time window having a predetermined time span may be used to buffer log records received from log producing unit 110. Processor 210 may process the log records buffered within the time window. Once a previous time window expires, a new time window may be initiated and the buffer can be cleared to receive new log records or contents in the buffer may be replaced by new incoming log records, until the new time window expires. This process can be repeated to process log records within any predetermined time span by setting a proper time window.

In some embodiments, the time span may be determined based on the time stamp of at least one of the plurality of log records. For example, in the historical log data processing mode, processor 210 may compare the time stamp of a log record with a threshold. The threshold may be a past time point, such as a specific date and/or time. The threshold may also be a time duration measured from the current time, such as 30 days from now, one year from now, etc. For example, processor 210 may compare the time stamp(s) of one or more log records with a threshold indicating 30 days from the current time, and determine that the time span to be a longer time span (e.g., one hour) when the time stamp(s) is/are older than 30 days, and determine that the time span to be a shorter time span (e.g., one minute) when the time stamp(s) is/are not older than 30 days (e.g., newer than the threshold). In this way, larger time span can be applied to older log records, which in turn may yield a higher degree of reduction in storage volume.

In step 340, processor 210 may group the log records within the subset into at least one group based on the time stamp of each of the log records within the subset. Time stamps of the respective log records in the at least one group may be within the time span. For example, processer 210 may execute instructions of grouping module 226 to perform step 340. In some embodiments, processor 210 may group log records based on the time stamp of a starting log record and the time span. For example, referring to FIG. 5, processor 210 may determine that log record 511 is a starting log record having a starting time stamp, and group all of the subsequent log records that are identified as within the subset (e.g., having a successful logging-in result) and whose time stamps are not later than the starting time stamp plus the time span into one group. For instance, when the time span is one minute, then log records 511, 512, 513, and 515 may be grouped together. In another example, when the time span is 30 seconds, then log records 511, 512, and 513 may be grouped together, while log record 515 may be group into another group.

In some embodiments, processor 210 may group log records based on a whole unit of time period specified by the time span. For example, assume that the time span is one minute, processor 210 may group all of the log records identified within a subset (e.g., sharing a common attribute) and also fall within a whole minute of time into one group. Again, take FIG. 5 for example, processor 210 may group all of the log records within the whole minute of 08:12 on 01/01/2020 that are also identified as within the subset (e.g., sharing the common attribute of successful logging-in) into one group. In this way, grouping can be performed quickly by filtering the log records according to minute, hour, date, etc., depending on the time span.

Returning to FIG. 3, method 300 may proceed to step 350, in which processor 210 may aggregate the log records in the at least one group based on the respective time stamps. For example, processor 210 may execute instructions of aggregation module 228 to perform step 350. In some embodiments, processor 210 may aggregate the multiple log records in a group to generate a single aggregated log record. Referring to the example of FIG. 4, assume that all of the log records 410 except log record 420 are grouped together in step 340, these log records in the group may be aggregated into an aggregated log record 430. Aggregated log record 430 may include the common attributes such as ID 414, network connection data field 416, and action data field 418. Aggregated log record 430 may also include an aggregated time stamp 432, which may include a starting time stamp (e.g., 08:12:01) corresponding to an earliest time stamp among the time stamps of the log records in the group, and an ending time stamp (e.g., represented as "–54") corresponding to a latest time stamp among the time stamps of the log records in the group. In this way, instead of storing individual time stamps, which may be in the order of hundred in even a short time span (e.g., a few minutes), the time stamp information can be stored using the starting and ending time stamps, significantly reducing the amount of data requiring storage.

Aggregated log record 430 may also include a quantity of the log records in the group. For example, the quantity can be represented by a count 440. Count 440 indicates the original number of log records in the group before aggregation. In this case, there are seven log records that are aggregated. Count 440 and aggregated time stamp 432 retain certain information contained in the original log records, and at the same time a single copy of the common attributes (e.g., 414, 416, and 418) is used to replace the duplicative information in the original log records. In this way, the amount of log data can be significantly reduced. It is noted that log record 420, which is not identified to be included in the subset in step 320, is maintained as its original form. As a result of the reduced volume of routine and highly duplicative log data, outliers such as log record 420 can be more easily identified. Often times, non-routine outliers are more likely associated with security threats, embodiments of the disclosure make it easier and faster to locate such security threats than conventional log systems. In another example, referring to FIG. 5, log records 511, 512, 513, and 515 may be aggregated into an aggregated log record 521, which includes the common attributes such as account ID, logging method, and logging result, as well as an aggregated time stamp and a count, similar to those in FIG. 4. After processing, original log records 510 become processed log records 520, which include a significantly smaller amount of data.

In some embodiments, some log records within a group grouped by processor 210 in step 340 may each include a quantitative attribute. For example, referring to FIG. 6, each log record in a group 610 may include an amount of transmission data (e.g., 612), an exemplary quantitative attribute, associated with the network connection activity corresponding to the log record. Processor 210 may aggregate log records in group 610 to generate an aggregated log record 630, using similar method to the example shown in FIG. 4. Different from FIG. 4, however, in FIG. 6 aggregated log record 630 may include an aggregated quantitative attribute 632 that include a summation of individual quantitative attributes of the log records with group 610. For example, the amount of data transmission shown in aggregated quantitative attribute 632 is the summation of individual amounts of data transmission in each log record in group 610. In this way, the non-duplicative information in group 610 can be maintained, to certain extent, in aggregated log record 630.

Returning to FIG. 3, method 300 may proceed to step 360, in which processor 210 may replace the log records in the at least one group with the aggregated log record. For example, referring to FIG. 1, processor 210 may send the aggregated log record back to log storage unit 130 along path E to replace the original log records within the group that are aggregated. In another example, processor 210 may send the aggregated log record instead of the original log records to log storage unit 130 along path C. In any case, the amount of data need to be stored in log storage unit 130 can be significantly reduced after the original log data are processed by log processing unit 120. In some embodiments, a 50% reduction can be achieved when the time span used for grouping original log records is set to be one minute, a further 50% reduction can be achieved when the time span is set to be one hour, and a further 50% reduction can be achieved when the time span is set to be one day.

Figure 7:
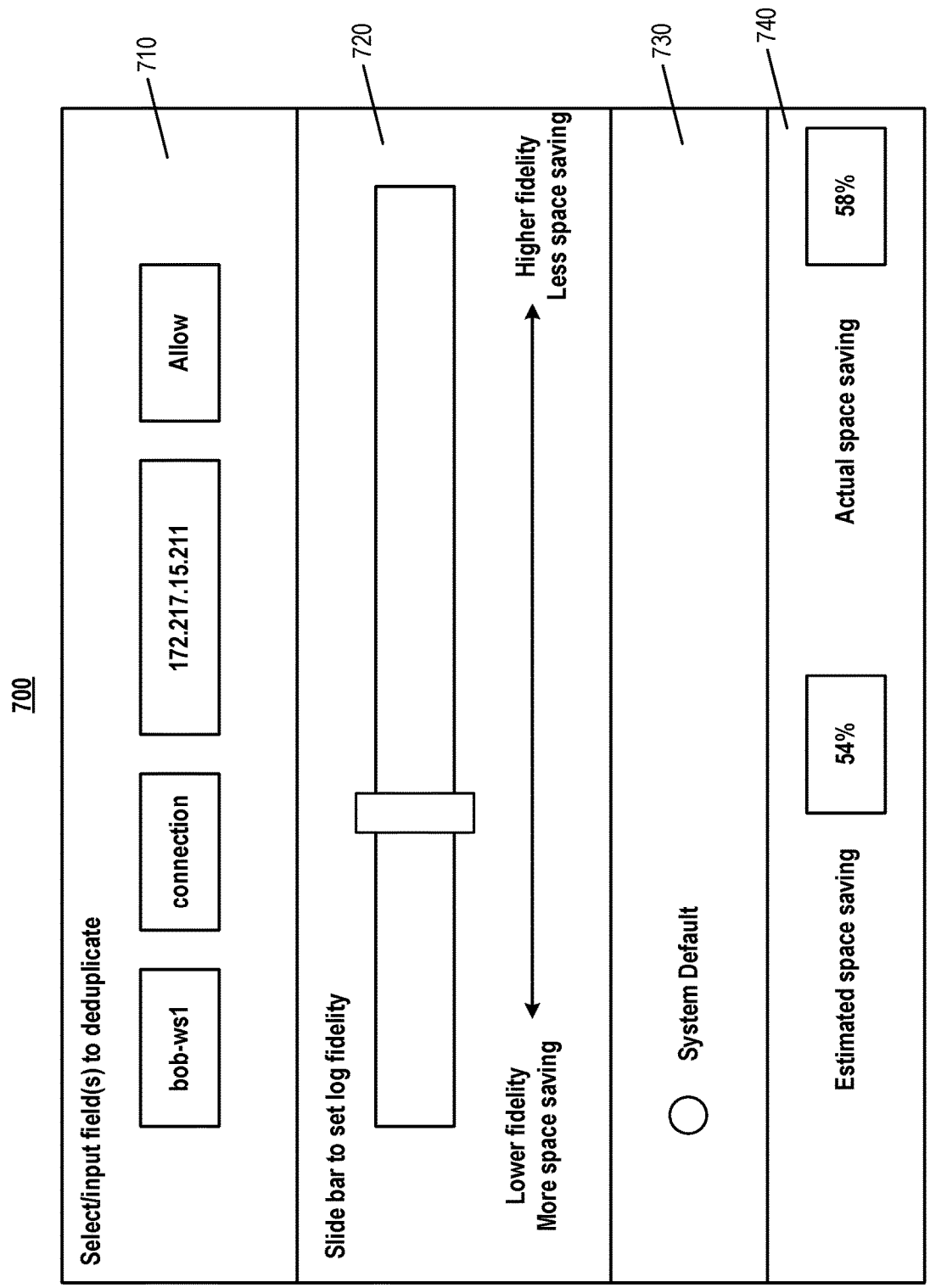
FIG. 7 illustrates an exemplary user interface, according to embodiments of the disclosure.

FIG. 7 illustrates an exemplary user interface 700 of system 100, or in particular log processing unit 120, according to embodiments of the disclosure. As shown in FIG. 7, user interface 700 may include several portions, each of which can be individually functioning or combined with other portion(s). Portion 710 may include a user selectable or fillable area in which data field(s) can be deduplicated are presented. Candidate data field(s) that can act as common attribute(s) may be prefilled into selectable blocks to allow a user to select. The user may also manually fill in one or more data fields into the block(s) as common attribute(s). Portion 720 may include a sliding bar to allow a user to slide left and right. For example, sliding the bar to the left may indicate that the deduplicated log data would have lower fidelity (e.g., dropping certain data field(s), using a larger time span, etc.) to achieve more storage space saving. On the other hand, sliding the bar right to the right may indicate that the deduplicated log data would have higher fidelity (e.g., maintaining more data field(s), using a smaller time span, etc.) at the expense of less space saving. Portion 730 may include a check box to select a system default option, in which parameters can be automatically set. Portion 740 may provide an estimated space saving (e.g., in percentage form) as the user is adjusting any one of portions 710, 720, or 730. The actual space saving can also be provided after the log data are processed.

In some embodiments, log data deduplication can be customized, for example, through an interface portion similar to portion 710. The customization may include selection of data field(s) to be maintained/kept, data field(s) to be discarded/removed, and/or data field(s) to be modified in the resulting aggregated log record. The customization may also include customizing how to modify one or more data field(s). In this way, log data processing can be made more flexible.

Figure 8:
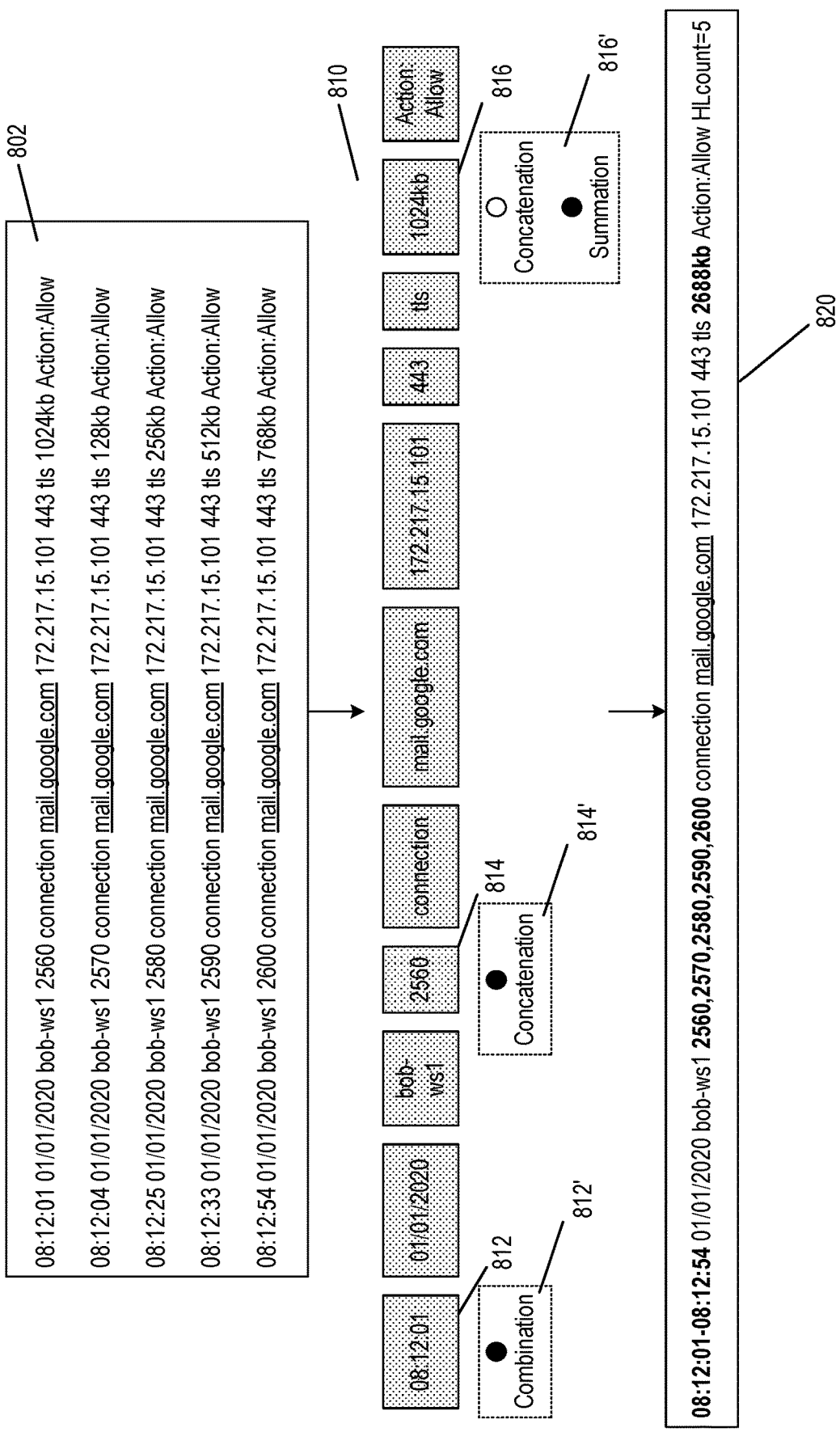
FIG. 8 illustrates an exemplary method of customizing computer log data deduplication, according to embodiments of the disclosure.

FIG. 8 illustrates an exemplary method of customizing log data deduplication, according to embodiments of the disclosure. As shown in FIG. 8, an original set of log data 802 may include multiple records each having a plurality of data fields. One or more of the data fields can be selected to be included or excluded in an aggregated log record. Certain data field(s) may be concatenated or summed. For example, a user may select one or more data field(s) to be included (or deselect one or more data field(s) to be excluded) in the aggregated log record through a user interface 810. In the example shown in FIG. 8, all data fields are selected, as shown in the shadowed blocks. For certain data fields, such as time stamp 812, source port 814, and bit court 816, the manner of aggregation may also be specified. For example, time stamp 812 may be aggregated by keeping the earliest and latest time stamps within a determined time span (e.g., 1 minute), while removing other time stamps between the earliest and latest time stamps. This type of aggregation may be indicated as "Combination" and may be pre-selected or selected by the user through an option box 812'. Source port 814 may be aggregated by concatenating individual port numbers with delimiters (e.g., ","). This type of aggregation may be indicated as "Concatenation" and may be pre-selected or selected by the user through an option box 814'. Bit count 816 may be aggregated by either concatenation or summation, and can be selected by the user using an option box 816'. A resulting aggregated log record 820 can be generated based on the customization of the deduplication process, in which time stamps are combined, source ports are concatenated, bit counts are summed, and all the other date fields are deduplicated to a single copy of each kind. As described above, a count of the original log records can be added to the aggregated log record 820.

Figure 9:
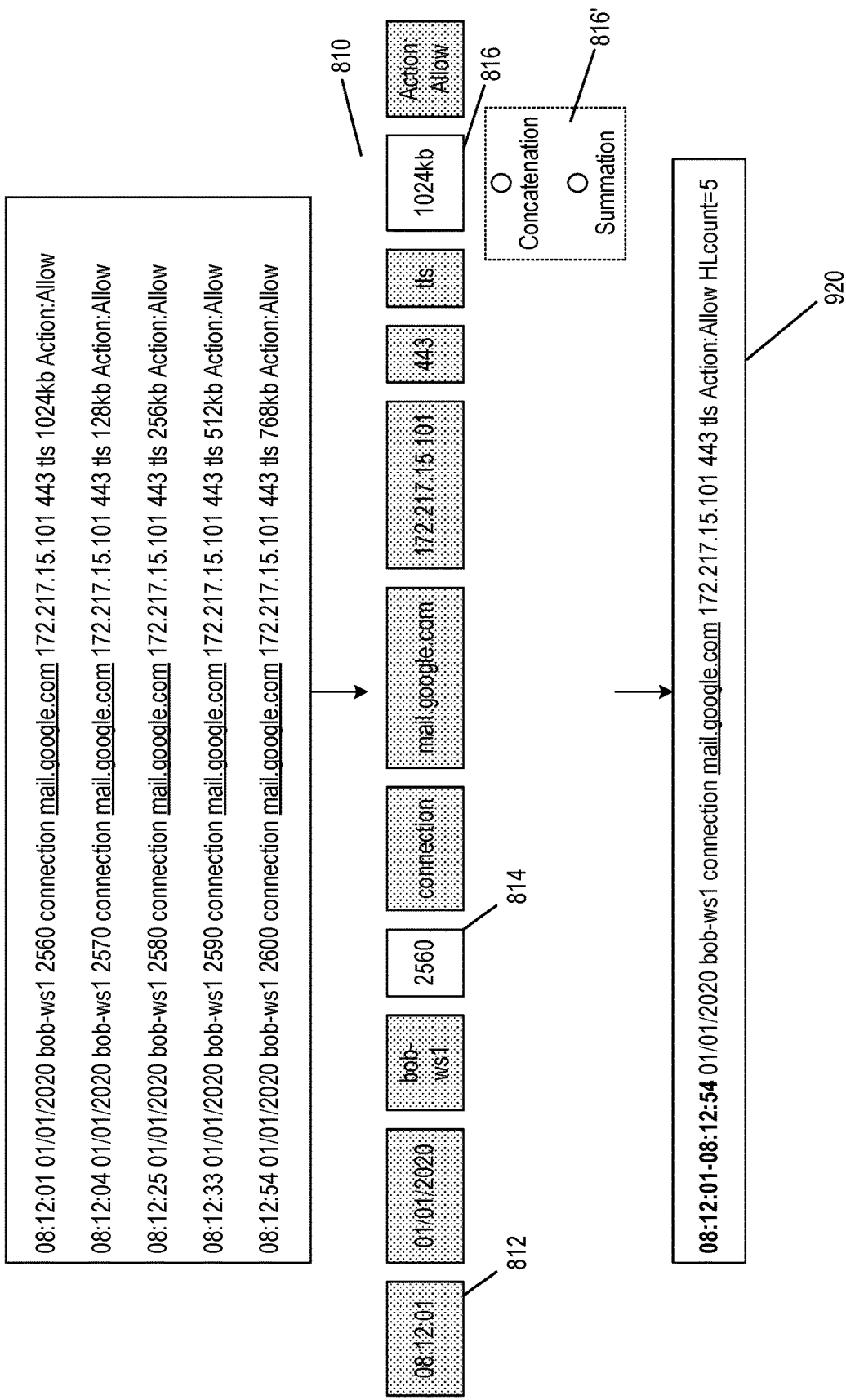
FIG. 9 illustrates another exemplary method of customizing computer log data deduplication, according to embodiments of the disclosure.

FIG. 9 illustrates another exemplary method of customizing log data deduplication, according to embodiments of the disclosure. Compared to FIG. 8, in FIG. 9 source port 814 and bit count 816 are not selected. As a result, these two data fields are not included in the aggregated log record 920. The user may select individual data fields to be included in the resulting aggregated log record through user interface 810, for example, by clicking on the corresponding data field blocks. After a data field is deselected, its associated option box may disappear, such as the case of source port 814. In another example, the option box may remain after a data field is deselected, but the options may become unselectable or ineffective, such as the case of bit count option box 816'. In some embodiments, when only one option is available to aggregate data fields, the corresponding option box may be omitted and the available option may be used as the default option, such as the case of time stamp 812.

A further aspect of the disclosure is directed to a non-transitory computer-readable medium storing instructions which, when executed, cause one or more processors to perform the methods disclosed herein. The computer-readable medium may be volatile or non-volatile, magnetic, semiconductor-based, tape-based, optical, removable, non-removable, or other types of computer-readable medium or computer-readable storage devices. For example, the computer-readable medium may be the storage device or the memory module having the computer instructions stored thereon, as disclosed. In some embodiments, the computer-readable medium may be a disc or a flash drive having the computer instructions stored thereon.

It will be apparent to those skilled in the art that various modifications and variations can be made to the disclosed system and related methods. Other embodiments will be apparent to those skilled in the art from consideration of the specification and practice of the disclosed system and related methods.

It is intended that the specification and examples be considered as exemplary only, with a true scope being indicated by the following claims and their equivalents.

The invention claimed is:

1. A system for managing computer log data, comprising: a memory storing computer-readable instructions; and at least one processor communicatively coupled to the memory, wherein the computer-readable instructions, when executed by the at least one processor, cause the at least one processor to perform operations comprising:
   accessing a plurality of log records, each of the plurality of log records comprising a time stamp and at least one attribute;
   identifying a subset of the plurality of log records based on the at least one attribute of each of the plurality of log records, wherein log records within the subset share a common attribute;
   grouping the log records within the subset into at least one group based on the time stamp of each of the log records within the subset, wherein time stamps of the respective log records in the at least one group are within a time span;
   generating an aggregated log record by aggregating log records in the at least one group based on the respective time stamps;
   adding a count value to the aggregated log record, the count value indicating an original number of log records in the at least one group before aggregation; and
   replacing the log records in the at least one group with the aggregated log record that includes the count value.

2. The system of claim 1, wherein:
   the at least one attribute comprises source information; and
   identifying the subset of the plurality of log records comprises:
       identifying the subset of the plurality of log records based on the source information of each of the plurality of log records, wherein log records within the subset share a common source.

3. The system of claim 1, wherein the operations comprise:
   determining the time span based on the time stamp of at least one of the plurality of log records.

4. The system of claim 3, wherein determining the time span comprises:
   comparing the time stamp of at least one of the plurality of log records with a threshold;
   determining the time span to be a first value when the time stamp is older than the threshold; and
   determining the time span to be a second value when the time stamp is newer than the threshold, wherein the first value is greater than the second value.

5. The system of claim 1, wherein aggregating the log records comprises:
   generating the aggregated log record based on the log records in the at least one group, wherein the aggregated log record comprises:
       the common attribute; and
       an aggregated time stamp.

6. The system of claim 5, wherein the aggregated time stamp comprises:
   a starting time stamp corresponding to an earliest time stamp among the time stamps of the log records in the at least one group; and an ending time stamp corresponding to a latest time stamp among the time stamps of the log records in the at least one group.

7. The system of claim 5, wherein:
each of the log records within the at least one group comprises a quantitative attribute; and
the aggregated log record further comprises:
an aggregated quantitative attribute comprising a summation of individual quantitative attributes of the log records within the at least one group.

8. The system of claim 5, wherein the operations comprise:
receiving a request for retrieving the log records within the at least one group; and
in response to the request, providing the aggregated log record instead of the log records within the at least one group.

9. A method for managing computer log data, comprising:
accessing a plurality of log records, each of the plurality of log records comprising a time stamp and at least one attribute;
identifying a subset of the plurality of log records based on the at least one attribute of each of the plurality of log records, wherein log records within the subset share a common attribute;
grouping the log records within the subset into at least one group based on the time stamp of each of the log records within the subset, wherein time stamps of the respective log records in the at least one group are within a time span;
generating an aggregated log record by aggregating the log records in the at least one group based on the respective time stamps;
adding a count value to the aggregated log record, the count value indicating an original number of log records in the at least one group before aggregation; and
replacing the log records in the at least one group with the aggregated log record that includes the count value.

10. The method of claim 9, wherein:
the at least one attribute comprises source information; and
identifying the subset of the plurality of log records comprises:
identifying the subset of the plurality of log records based on the source information of each of the plurality of log records, wherein log records within the subset share a common source.

11. The method of claim 9, further comprising:
determining the time span based on the time stamp of at least one of the plurality of log records.

12. The method of claim 11, wherein determining the time span comprises:
comparing the time stamp of at least one of the plurality of log records with a threshold;
determining the time span to be a first value when the time stamp is older than the threshold; and
determining the time span to be a second value when the time stamp is newer than the threshold, wherein the first value is greater than the second value.

13. The method of claim 9, wherein aggregating the log records comprises:
generating the aggregated log record based on the log records in the at least one group, wherein the aggregated log record comprises:
the common attribute;
and
an aggregated time stamp.

14. The method of claim 13, wherein the aggregated time stamp comprises:
a starting time stamp corresponding to an earliest time stamp among the time stamps of the log records in the at least one group; and
an ending time stamp corresponding to a latest time stamp among the time stamps of the log records in the at least one group.

15. The method of claim 13, wherein:
each of the log records within the at least one group comprises a quantitative attribute; and
the aggregated log record further comprises:
an aggregated quantitative attribute comprising a summation of individual quantitative attributes of the log records within the at least one group.

16. The method of claim 13, further comprising:
receiving a request for retrieving the log records within the at least one group; and
in response to the request, providing the aggregated log record instead of the log records within the at least one group.

17. A non-transitory computer-readable medium storing instructions that, when executed by at least one processor, cause the at least one processor to perform a method for managing computer log data, the method comprising:
accessing a plurality of log records, each of the plurality of log records comprising a time stamp and at least one attribute;
identifying a subset of the plurality of log records based on the at least one attribute of each of the plurality of log records, wherein log records within the subset share a common attribute;
grouping the log records within the subset into at least one group based on the time stamp of each of the log records within the subset, wherein time stamps of the respective log records in the at least one group are within a time span;
generating an aggregated log record by aggregating the log records in the at least one group based on the respective time stamps;
adding a count value to the aggregated log record, the count value indicating an original number of log records in the at least one group before aggregation; and
replacing the log records in the at least one group with the aggregated log record that includes the count value.

18. The non-transitory computer-readable medium of claim 17, wherein aggregating the log records comprises:
generating the aggregated log record based on the log records in the at least one group, wherein the aggregated log record comprises:
the common attribute;
and
an aggregated time stamp.

* * * * *